(12) United States Patent
Terrenzi et al.

(10) Patent No.: US 8,763,512 B2
(45) Date of Patent: Jul. 1, 2014

(54) AMPHIBIOUS ARMOR

(75) Inventors: Edward J. Terrenzi, Fairhaven, MA (US); Boris Y. Rozenoyer, Watertown, MA (US); Robert C. Sykes, Burlington, MA (US); Justin Trent Shackleford, Pocassset, MA (US); James A. Carter, Bedford, MA (US); Jason Michael Kruise, Marlborough, MA (US)

(73) Assignee: Foster-Miller, Inc., Waltham, MA (US)

( * ) Notice: Subject to any disclaimer, the term of this patent is extended or adjusted under 35 U.S.C. 154(b) by 41 days.

(21) Appl. No.: 13/506,421

(22) Filed: Apr. 18, 2012

(65) Prior Publication Data

US 2014/0150632 A1    Jun. 5, 2014

(51) Int. Cl.
*F41H 7/02* (2006.01)

(52) U.S. Cl.
USPC .............................. 89/36.02; 89/910; 89/930

(58) Field of Classification Search
USPC ............ 89/36.01, 36.02, 36.09, 36.11, 36.12, 89/930, 929, 910
See application file for complete search history.

(56) References Cited

U.S. PATENT DOCUMENTS

| | | | |
|---|---|---|---|
| 1,266,196 A | 5/1918 | Bentley | |
| 2,380,393 A | 7/1945 | Berg | |
| 2,751,289 A | 6/1956 | Elliot | |
| 4,119,750 A * | 10/1978 | Porter | 428/105 |
| 5,200,256 A | 4/1993 | Dunbar | |
| 6,698,331 B1 | 3/2004 | Yu et al. | |
| 6,825,137 B2 * | 11/2004 | Fu et al. | 442/135 |
| 7,210,390 B1 | 5/2007 | Olson et al. | |
| 2012/0103177 A1 | 5/2012 | Coltrane | |
| 2012/0325076 A1 * | 12/2012 | Monette, Jr. | 89/36.02 |

OTHER PUBLICATIONS

Written Opinion of the International Searching Authority for PCT Application No. PCT/US2013/28583 mailed Dec. 24, 2013 (three (3) pages).

* cited by examiner

*Primary Examiner* — Bret Hayes
*Assistant Examiner* — Joshua Freeman
(74) *Attorney, Agent, or Firm* — Iandiorio Teska & Coleman, LLP

(57) ABSTRACT

Buoyant armor for jacketed rounds includes an outer, laminate reinforced strike face having a hardness greater than 640 Brinell. The strike face is configured to strip the jacket off a projectile as it passes through the strike face and to rotate the projectile. An inner, laminate reinforced strike face is separated from the outer, laminate reinforced strike face by a spacer layer. Foam greater than 40 mm thick is disposed behind the inner strike face and is configured to disperse a round and/or its fragments and to provide buoyancy to the armor.

12 Claims, 3 Drawing Sheets

AMPHIBIOUS ARMOR

FIELD OF THE INVENTION

The subject invention relates to armor.

BACKGROUND OF THE INVENTION

Buoyant armor typically includes a metal outer layer or strike face and cellular material between the strike face and the vehicle or vessel hull. See U.S. Pat. No. 1,266,196. See also U.S. Pat. Nos. 5,200,256 and 6,698,331 and pending patent application Ser. No. 12/765,546.

Still, there is a need for specialized armor adapted for military amphibious vehicles. One example is the Marine Corps "Expeditionary Fighting Vehicle" (EFV). Another example is the "Marine Personnel Carrier" or MPC. These and other vehicles may encounter many different caliber rounds and armor piercing projectiles such as 7.62 mm or 14.5 mm armor piercing type bullets or bomb fragments of various sizes.

Existing armor for such vehicles may not adequately protect the vehicle occupants when such rounds are fired at the vehicle.

SUMMARY OF THE INVENTION

The invention provides for a new armor system configuration especially adapted for amphibious vehicles.

Featured is a buoyant armor for jacketed rounds comprising an outer, laminate reinforced strike face having a hardness of greater than 640 Brinell and configured to strip the jacket off a round as it passes through the strike face and to rotate the projectile. Foam greater than 40 mm thick is disposed behind the strike face and is configured to disperse the round and/or its fragments and also to provide buoyancy to the armor.

In one example, the outer, laminate reinforced strike face is between 2 and 10 mm thick, (e.g., between 3-6 mm). The preferred foam includes a thicker lower density layer sandwiched between two thinner structural foam layers. The lower density layer may be a closed cell plastic foam.

Further included, in one embodiment is an inner, laminate reinforced strike face between the outer, laminate reinforced strike face and the foam. This layer is configured to fragment a stripped round. The inner, laminate reinforced strike face is preferably thicker than the outer, laminate reinforced strike face. The inner, laminate reinforced strike face preferably has a hardness greater than 640 Brinell, is reinforced, and is between 5-8 mm thick. In the preferred embodiment, there a spacer layer between the inner and outer laminate reinforced strike faces made of structural foam.

Buoyant armor in accordance with examples of the invention include an outer, laminate reinforced strike face having a hardness greater than 640 Brinell and configured to strip the jacket of a projectile as it passes through the strike face and to rotate the projectile, an inner, laminate reinforced strike face separated from the outer, laminate reinforced strike face by a spacer layer, and foam greater than 40 mm.

In one example, buoyant armor comprises an outer, laminate reinforced strike face having a hardness greater than 640 Brinell and a thickness of between 2-10 mm and configured to strip the jacket of a round as it passes through the strike face and to rotate the round. A thicker low density foam layer sandwiched is between two thinner structural foam layers behind the outer, laminate reinforced strike face. Together, the foam layers have a thickness of greater than 40 mm and are configured to disperse the round and/or its fragments and to provide buoyancy to the armor.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
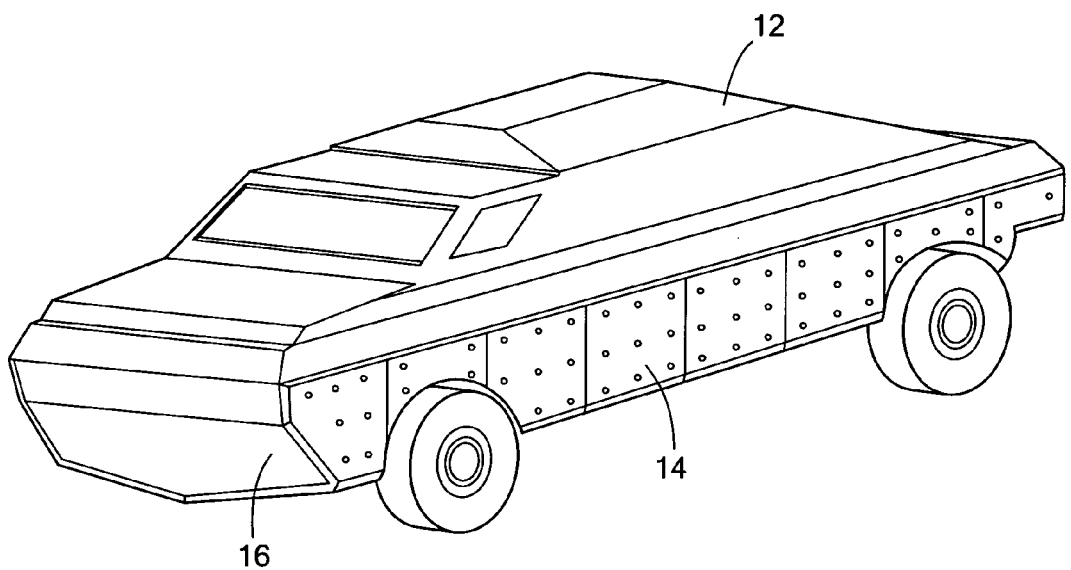
FIG. 1 is a schematic three dimensional view showing an example of an amphibious vehicle equipped with the buoyant armor of the invention.

Aside from the preferred embodiment of embodiments disclosed below, this invention is capable of other embodiments and of being practiced or being carried out in various ways. Thus, it is to be understood that the invention is not limited in its application to the details of constructions and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
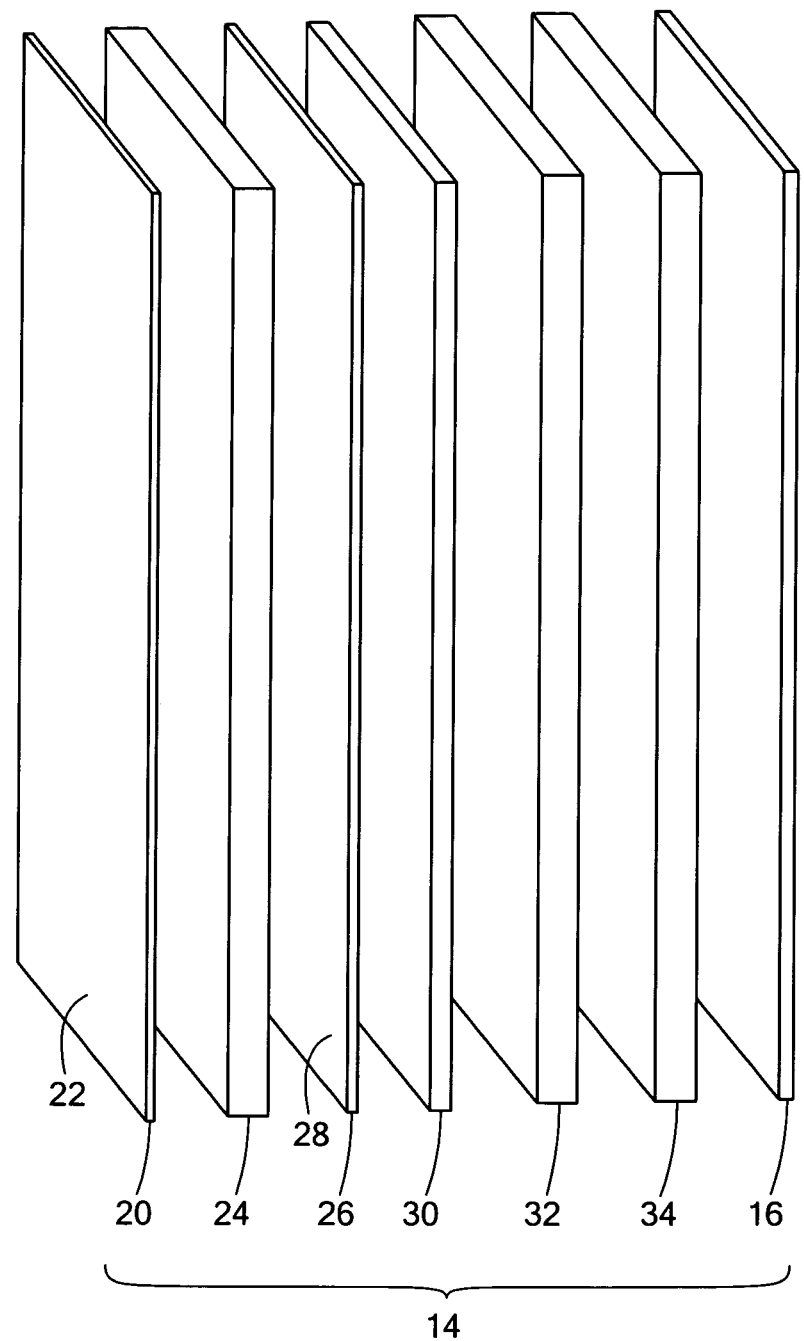
FIG. 2 is a schematic three dimensional exploded view showing various components of an example of an armor plate in accordance with the invention.

FIG. 1 shows amphibious vehicle 12 protected with one or more armor plates 14 bolted to metal vehicle hull 16. More or less plates may be included. In one preferred design, each plate 14, FIG. 2 includes 3-6 mm thick outer laminate reinforced steel strike face 20. Hard steel (650 Brinell hardness) available from SSAB Swedish Steel, AB under the brand name "Armox" can be used. Outer surface 22 of strike face 20 was laminated, for example, with a fiber reinforced composite material such as a reinforced epoxy glass scrim to mitigate cracking of the brittle steel when impacted by a round. The laminate reinforcement was undertaken by Incident Control Systems, Inc. located in New Bedford, Mass., seller of "Revolution" brand armor.

Strike face 20 is thus designed to strip the jacket off a round as it easily passes through strike face 20. Strike face 20 is also configured to rotate the projectile, e.g., to cause it to yaw. Typically, the back or rear surface of the strike face is not reinforced. The strike face is preferably designed to allow an armor piercing projectile to pass through the strike face without severely damaging the strike face. The strike face, while reducing some of the velocity of the projectile, causes the projectile to yaw or rotate sideways so that the armor piercing core point is now oriented at an angle as opposed to normal to the armor plate components.

Behind strike face 20 is 12.7-38 mm spacer layer 24 (typically styrene acrylonitrile polymer structural foam). This foam material is used to prevent a reflected projectile shock wave from damaging strike face 20. Foam layer 24 also provides support to strike face 20 and creates space sufficient for the projectile to turn or rotate. Foam layer 24 also provides buoyancy to the armor system.

Inner strike face 26 is typically 3-7 mm thick and again it is reinforced with an outer laminate and is made of hard steel (650 Brinell) as discussed above. Preferably, strike face 26 is the same material as strike face 20 but strike face 28 is thicker.

Inner strike face 26 fractures the hardened steel core of the round upon its impact with strike face 26 taking most of the energy out of the projectile as well as significantly reducing its velocity. Strike face 26 thus fragments the stripped round.

Foam is then present between inner strike face 26 and vehicle hull 16, preferably thicker low density foam layer 32 sandwiched between thinner structural foam layers 30 and 34. Ply 30 can be 12.7-25.4 mm styrene acrylonitrile polymer structural foam, layer 34 can be 12.7-38 mm styrene acrylonitrile polymer structural foam, and layer 32 can be 25.4-50.8 industrial polymethacrylimide closed cell plasticfoam.

The first structural foam layer 30 functions to support strike face 26. Ply 32 functions to add buoyancy and to provide a void space. This material typically has a low density and thus is very soft and prone to cracking. Ply 34 is bonded to the back of layer 32 and thus layers 32 and 34 serve to reinforce low density buoyant foam ply 32.

Once projectile fragments pass through inner strike face 26, they enter foam plies 30, 32, 34 which together increase the spall cone and disperse the fragments onto hull plate 16.

Preferably, the aggregate specific gravity of all the layers combined is less than one $g/cm^3$ making it positively buoyant. Particularly, it is preferred that 40-50 mm of foam reside behind first outer hardened metal strike face 20.

In one particular example, outer strike face 20 was 4 mm thick, foam layer 24 was 25.4 mm thick, inner strike face 26 was 5 mm thick, foam layer 30 was 12.7 mm thick, foam layer 32 was 25.4 mm thick, and foam layer 34 was 25.4 mm thick. All of these layers were bonded to each other using an adhesive. The resulting armor plate was bolted to a vehicle hull 8 mm thick make of high hardness steel. Strike face 20 could, however, be between 2-10 mm thick.

The technology was tested against the STANAG 4569 Level III and Level IV Threat requirements with a 14.5 mm×114 B32 Armor Piercing Projectile, a 7.62 mm×51 WC Armor Piercing Projectile, and 20 mm Fragment Simulating Projectiles at high velocities.

Figure 3:
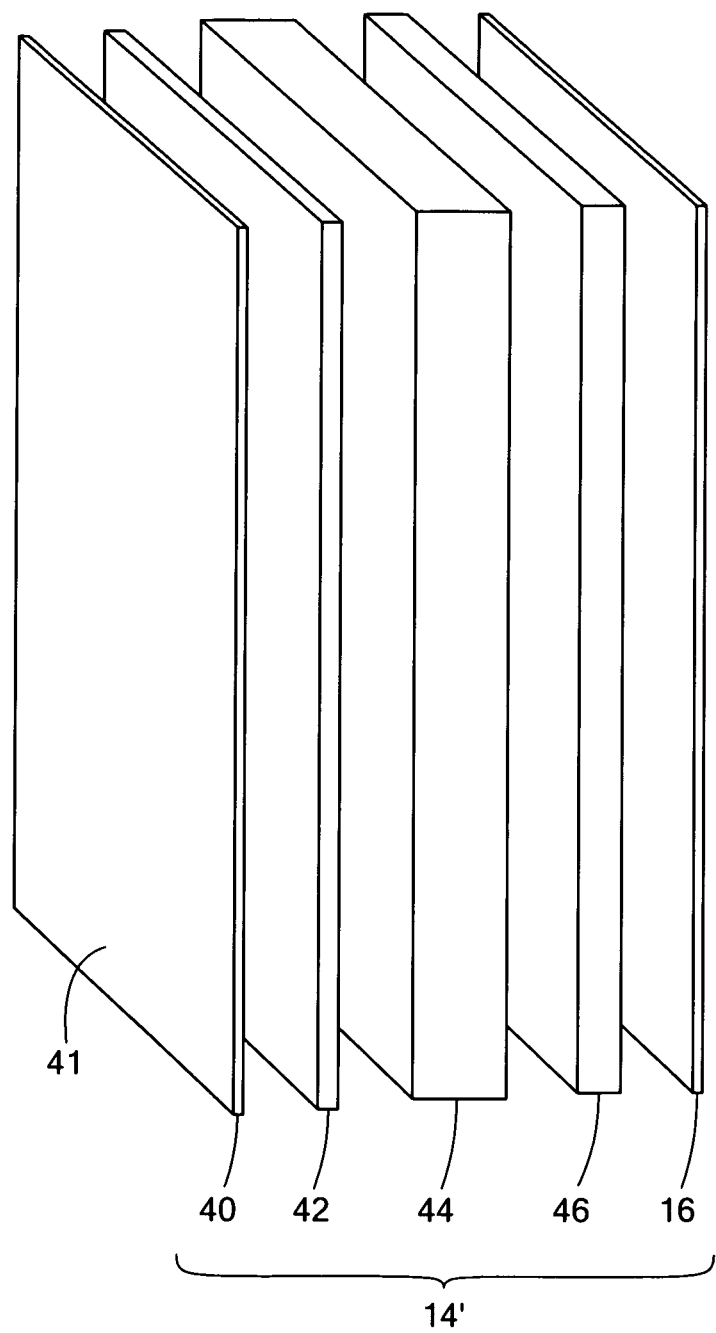
FIG. 3 is a schematic three dimensional exploded view showing the various components of another example of an armor plate in accordance with the invention.

In another example, armor plate 14', FIG. 3 includes outer strike face 40 and foam plies 42, 44, and 46. Typically outer strike face 40 includes laminate reinforced surface 41 and outer strike face 40 is 5-8 mm thick. Thus strike face 40 has the same composition as strike face 20, FIG. 2 but is thicker. Foam layers 42, 44, and 46 have the same composition as foam layers 30, 32, and 34, FIG. 2, respectively. Typically, foam layer 42 is 6.3-50.8 mm thick, foam layer 44 is 12.7-50.8 mm thick, and foam layer 46 is 6.35-50.8 mm. In one particular example, foam layer 42 was 12.7 mm thick, foam layer 44 was 50.8 mm thick, and foam layer 46 was 25.4 mm thick for an 8 mm high hardness steel vehicle hull 16. In total, foam greater than 40 mm thickness is preferred.

Strike face 40 preferably has a hardness greater than 640 Brinell. The steel material is laminated with a reinforced epoxy glass scrim to mitigate cracking of the brittle steel as discussed above. Strike face 40 is designed to allow the armor piercing projectile to pass through the strike face without severely damaging the strike face. When the projectile passes through strike face 40, the projectiles jacket is stripped from the round and the hardened steel core penetrator is fractured typically with the point being completely broken apart. Additionally, strike face 40 significantly reduces the velocity of the projectile and causes the larger remnants of the fractured core pieces to yaw or rotate sideways so that the larger core pieces are more likely to impact hull 16 broadside.

Structural foam layer 42 is used to support steel strike face 40. Foam layer 44 is used for buoyancy and void space. Structural foam layer 46 is bonded to the back of low density buoyant foam layer 44 and together with foam layer 42 reinforces and supports low density buoyant foam layer 44.

Once the projectile fragments pass through strike face 40, they enter foam layers 42, 44, and 46 which serve to increase the spall cone and disperse the fragments onto hull plate 16. Again, the combined aggregate specific gravity of the complete armor assembly is less than one $g/cm^3$, making it positively buoyant.

A system of this configuration with an 8 mm strike face was tested on a steel hull and another system with a 6 mm strike face was tested on an aluminum hull.

The result in these and other configurations is a new armor system especially adapted for amphibious vehicles. The armor of the subject invention may find uses for other vehicles and vessels, however.

Therefore, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. Buoyant armor for jacketed rounds comprising: an outer, laminate reinforced strike face having a hardness greater than 640 Brinell and configured to strip the jacket of a projectile as it passes through the strike face and to rotate the projectile;
   an inner, laminate reinforced strike face separated from the outer, laminate reinforced strike face by a spacer layer; and
   foam greater than 40 mm thick behind the inner strike face and configured to disperse a round and/or its fragments and to provide buoyancy to the armor; said foam including a thicker lower density layer sandwiched between two thinner structural foam layers; and
   the aggregate specific gravity of all said layers combined being less than one $g/cm^3$.

2. The armor of claim 1 in which the outer, laminate reinforced strike face is between 2 and 10 mm thick.

3. The armor of claim 1 in which the outer, laminate reinforced strike face is between 3 and 6 mm thick.

4. The armor of claim 1 in which the lower density layer is a closed cell plastic foam.

5. The armor of claim 1 in which the inner, laminate reinforced strike face is thicker than the outer, laminate reinforced strike face.

6. The armor of claim 1 in which the inner, laminate reinforced strike face has a hardness greater than 640 Brinell.

7. The armor of claim 1 in which the inner, laminate of strike face is between 5-8 mm thick.

8. The armor of claim 1 in which the spacer layer includes structural foam.

9. Buoyant armor for jacketed rounds comprising:
- an outer, laminate reinforced strike face having a hardness greater than 640 Brinell and a thickness of between 2-10 mm and configured to strip the jacket off a round as it passes through the strike face and to rotate the round;
- a foam layer behind the outer laminate reinforced strike face configured to prevent a reflected projectile shock wave from damaging the outer, laminate reinforced strike face;
- an inner, laminate reinforced strike face behind said foam layer and configured to fragment the stripped round;
- a thicker low density foam layer sandwiched between two thinner structural foam layers behind the inner, laminate reinforced strike face and together having a thickness greater than 40 mm and configured to disperse the round and/or its fragments and provide buoyancy to the armor; and
- the aggregate specific gravity of all said layers combined being less than one $g/cm^3$.

10. The armor of claim 9 in which the low density foam layer is a closed cell plastic foam.

11. The armor of claim 9 in which the inner, laminate reinforced strike face has a hardness greater than 640 Brinell.

12. The armor of claim 9 in which the inner, laminate of strike face is between 5-8 mm thick.

\* \* \* \* \*